(12) United States Patent
Strand

(10) Patent No.: US 11,215,216 B2
(45) Date of Patent: Jan. 4, 2022

(54) BREAKAWAY NUT

(71) Applicant: Greaves Corporation, Centerbrook, CT (US)

(72) Inventor: Matthew B. Strand, Lyme, CT (US)

(73) Assignee: Greaves Corporation, Centerbrook, CT (US)

( * ) Notice: Subject to any disclaimer, the term of this patent is extended or adjusted under 35 U.S.C. 154(b) by 252 days.

(21) Appl. No.: 16/390,041

(22) Filed: Apr. 22, 2019

(65) Prior Publication Data

US 2019/0331153 A1 Oct. 31, 2019

Related U.S. Application Data

(60) Provisional application No. 62/663,348, filed on Apr. 27, 2018.

(51) Int. Cl.
*F16B 31/02* (2006.01)
*F16B 39/02* (2006.01)

(52) U.S. Cl.
CPC .......... *F16B 31/021* (2013.01); *F16B 39/02* (2013.01)

(58) Field of Classification Search
CPC .......... F16B 31/021; F16B 9/02; F16B 7/187; F16B 21/10
See application file for complete search history.

(56) References Cited

U.S. PATENT DOCUMENTS

| | | | | |
|---|---|---|---|---|
| 3,667,339 A * | 6/1972 | Dame | ........... | F16B 31/021 411/4 |
| 4,068,555 A * | 1/1978 | Volkman | ........... | F16B 31/021 411/2 |
| 4,575,274 A * | 3/1986 | Hayward | ........... | F16D 9/08 174/750 |
| 4,789,759 A * | 12/1988 | Jones | ........... | H02G 3/0675 174/655 |
| 5,297,458 A * | 3/1994 | Smith | ........... | B25B 13/06 81/124.2 |
| 5,658,017 A * | 8/1997 | Chirehdast | ........... | B60T 17/043 285/3 |
| 6,102,913 A * | 8/2000 | Jackson | ........... | A61B 17/7032 411/5 |
| 6,322,108 B1 * | 11/2001 | Riesselmann | ........... | F16L 15/00 285/3 |
| 6,910,826 B1 * | 6/2005 | Damiano | ........... | F16B 37/00 403/2 |
| 8,262,135 B2 * | 9/2012 | Nakata | ........... | F16L 19/103 285/3 |
| 8,967,933 B2 * | 3/2015 | Silva | ........... | F16B 37/0828 411/427 |

* cited by examiner

*Primary Examiner* — Flemming Saether

(74) *Attorney, Agent, or Firm* — Bachman and Lapointe PC; George Coury

(57) ABSTRACT

A breakaway nut includes a threaded section; a hex portion; and a breakaway portion connecting the threaded section and the hex portion, wherein a slot is defined in the hex portion along an axial dimension of the hex portion.

10 Claims, 2 Drawing Sheets

BREAKAWAY NUT

CROSS SECTION TO RELATED APPLICATION

This application claims benefit of U.S. Patent Application No. 62/663,348, filed Apr. 27, 2018, the disclosure of which is incorporated by reference herein.

BACKGROUND OF THE INVENTION

The invention relates to a breakaway nut having a threaded section to be attached to a threaded structure, and a hex portion for engaging a tool to tighten the nut onto the threaded structure. The hex portion is connected to the threaded section through a breakaway section that fails when torque applied to the hex portion exceeds a pre-defined value. When this happens, the hex portion separates from the threaded section, as is desired.

Known breakaway nuts are used for various purposes, and a typical breakaway nut is illustrated in prior art FIG. 1. In FIG. 1, the threaded section is shown at 1, and the hex portion is shown at 2. The hex portion 2 is joined to the threaded section 1 through breakaway section 3.

Breakaway nuts such as the one shown in FIG. 1 are typically hollow through both hex portion 2 and threaded section 1 so that the breakaway nut can be applied over a structure such as a protruding threaded shaft or the like. When the hex portion breaks away from the threaded section, the hex portion is lifted away and discarded or recycled, and the tightened threaded portion remains in place as intended.

In one application of a breakaway nut, the nut is to be applied over a cable, that is, with the cable passing through the threaded section and the hex portion. Unfortunately, in this situation, when the hex portion breaks away it is trapped on the cable and can only be left in place, which is at the very least unsatisfactory for aesthetic reasons. Of course, the loose hex portion can also interfere with subsequent use or operation of the components that are being connected. The present disclosure addresses this issue.

SUMMARY OF THE INVENTION

In accordance with the invention, a breakaway nut comprises a threaded section, a hex portion, and a breakaway portion connecting the hex portion and the threaded section, wherein a slot is defined through the hex portion and into the breakaway portion such that, when the breakaway nut breaks at the breakaway portion, the hex portion splits into two sections.

The threaded section can be any desired form of a threaded connector, typically a hollow cylindrical tube or ring with inwardly facing threads designed to threadedly mate with an outwardly threaded structure.

The hex portion is referred to as a hex portion because in one aspect of the disclosure the hex portion has radially outwardly defined flats in a hexagon pattern for engaging with a standard tool. It is of course possible that the outer structure of the hex portion can have different configuration or structure to be engaged with a tool, for example to apply torque, and this is well within the scope of the present invention.

According to one non-limiting aspect of the disclosure, the slot through the hex portion can divide the hex portion into half sections. Further, the slot that defines the split hex portion should be relatively narrow so that sufficient surface area is preserved to allow stable engaging of the hex portion with a tool. It is also preferred that the slot extend altogether through the side wall of the hex portion, and at least into the breakaway portion, so that the hex portion will divide along the slot when it breaks away from the threaded section. In this manner, when the breakaway nut is applied to a threaded receiving structure with a cable passing through the center of the threaded section and the hex portion, when the hex portion breaks away, the divided sections of the hex portion fall away from the cable and are no longer trapped in place.

Other details, aspects and advantages of the invention will appear in the detailed description to follow.

BRIEF DESCRIPTION OF THE DRAWINGS

A detailed description of preferred embodiments of the invention follows, with reference to the attached drawings, wherein.

DETAILED DESCRIPTION

Figure 1:
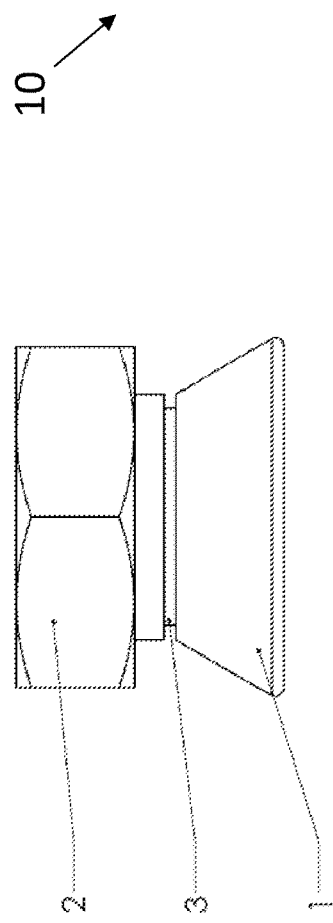
FIG. 1 illustrates a prior art breakaway nut.

The invention relates to a breakaway nut having a split hex portion which, when broken away from a threaded section, separates into sections which can readily fall away from a cable passing through same.

FIGS. 2-5 show a breakaway nut 10 according to the disclosure. Breakaway nut 10 has a threaded section 12 and a hex portion 14. Hex portion 14 is connected to threaded section 12 through a breakaway portion 16. A slot 18 is defined through hex portion 14 to divide hex portion 14 into sections, and slot 18 can extend through the entire axial dimension of hex portion 14, at least up to or optionally into the breakaway portion 16.

Threaded section 12 can be any form of rotatably applied connector, particularly of the type where torque is applied to secure threaded section 12 to a cooperating stationary structure such as a threaded shaft or pin, for example.

Figure 2:
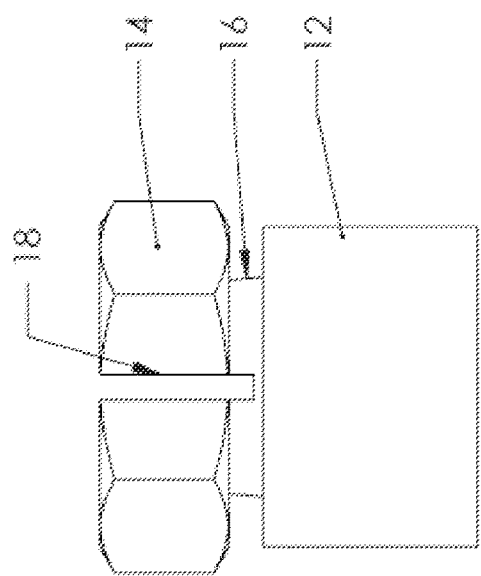
FIG. 2 illustrates a side view of a breakaway nut according to the present disclosure.
Figure 3:
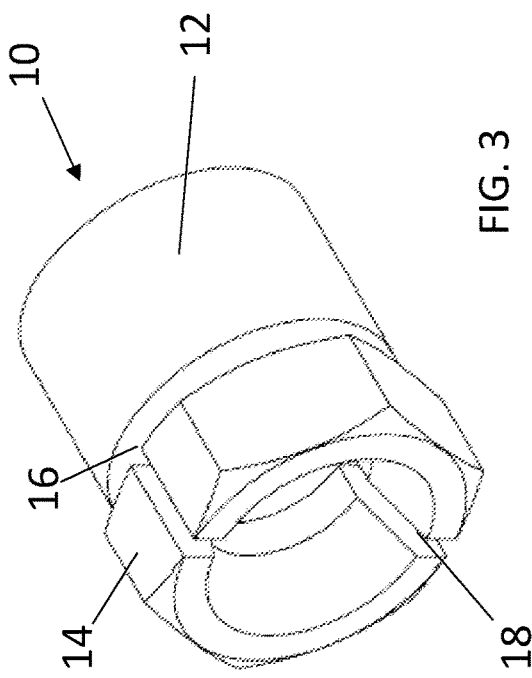
FIG. 3 is a perspective view of the breakaway nut of FIG. 2.

In FIG. 2, threaded section 12 is shown as a cylindrical structure having a substantially smooth outer wall, and threads (not shown) defined facing inwardly for engaging with an outwardly threaded structure in well-known manner. Of course, threaded section 12 could have alternatively configured structure, for example a somewhat conical outer structure as shown in the configuration of FIG. 1, or the like.

Hex portion 14 is shown in the drawings as having six radially outwardly defined flats for engagement with a suitable tool such a hex or socket wrench or the like. It should be appreciated that other configurations are possible instead of a hex shape, and the actual radially outwardly facing structure could have more or less flat surfaces, or some other specialty or specialized configuration to be engaged with a suitable matching tool.

Breakaway portion 16 is a structurally weakened portion of the breakaway nut 10 and is designed to be the first part of nut 10 to fail when a certain threshold torque is applied to hex portion 14 of nut 10. In this manner, as is known to a person skilled in the art, nut 10 can be configured such that hex portion 14 breaks away from threaded section 12 when a certain torque or other force is reached, for example to prevent over-tightening of threaded section 12 onto a matching threaded article. Breakaway portion 16 can be formed as a scored, machined or otherwise reduced-thickness portion of the nut, and can be configured in any way that produces the desired torque-induced failure at breakaway portion 18.

As set forth above, breakaway nuts such as the ones illustrated in FIGS. 1 and 2 may at times be used to connect in an environment where a cable or other structure extends through nut 1, 10 and makes it impossible or impractical to slide a broken away hex portion off the end of the cable. As set forth above, this results in the broken away hex portion loose on the cable where it can cause various issues. The present invention addresses this problem through slot 18, which divides hex portion 14 into sections that can fall away from the cable, that is, be removed to either side of the cable, when hex portion 14 according to this disclosure breaks away from threaded portion 12. This is accomplished with slot 18 as discussed above.

Slot 18 can be machined, ground, stamped or otherwise formed into breakaway nut 10 in any way known to a person skilled in the art. The drawings show slot 18 passing through a radial center of hex portion 14 so that hex portion 14 is divided into two halves by slot 18. It should be appreciated that slot 18 can be configured differently, for example to separate hex portion 14 into non-symmetrical portions, so long as they allow the portions to be removed from a cable passing therethrough.

Slot 18 advantageously is positioned to pass through the entire axial dimension of hex portion 14, and more preferably extend into breakaway portion 16. This ensures that hex portion 14 separates into two sections when it breaks away from threaded section 12, as desired. Of course, in some circumstances it may be desirable to extend slot 18 only mostly through hex portion 14, for example such that the sections of hex portion 14 are still lightly held together when they separate from threaded section 12. This could be desirable in some instances, for example where it is desired to control removal of the sections of hex portion 14, rather than have them fall away, and perhaps scatter or be lost, during installation. Application of a small additional mechanical force by the installer, after separation of hex portion 14 from threaded section 12, could be used to finish separation along slot 18 by breaking the small remaining amount of material between sections of hex portion 14.

Slot 18 is preferably relatively narrow as compared to the dimension of hex portion 14, for example in order to preserve sufficient radially outwardly facing surface area for proper engagement with a tool, and also to ensure radially stable torque being applied from a tool to the hex portion. Preferably, slot 18 has a width of between about 1 and 15% of the diameter of hex portion 14.

Figure 4:
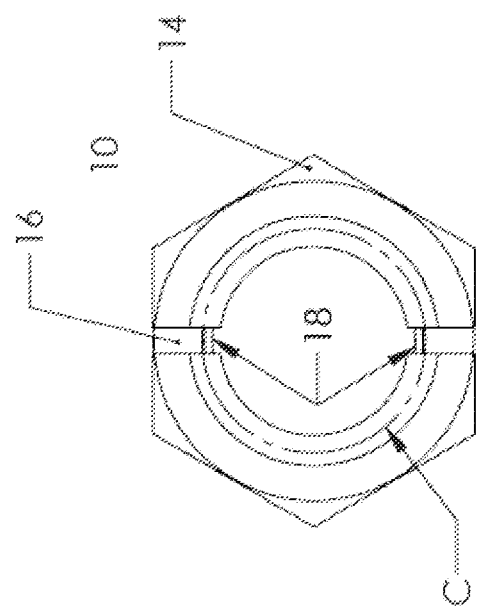
FIG. 4 is a top view of the apparatus of the present disclosure illustrating separation of sections of the hex portion once the hex portion breaks away from the threaded section.

FIG. 4 shows the components of the disclosure discussed above, and shows arrows A in the direction of which sections of hex portion 14 would be removed from a cable C passing through the center or central passage defined within nut 10.

Figure 6:
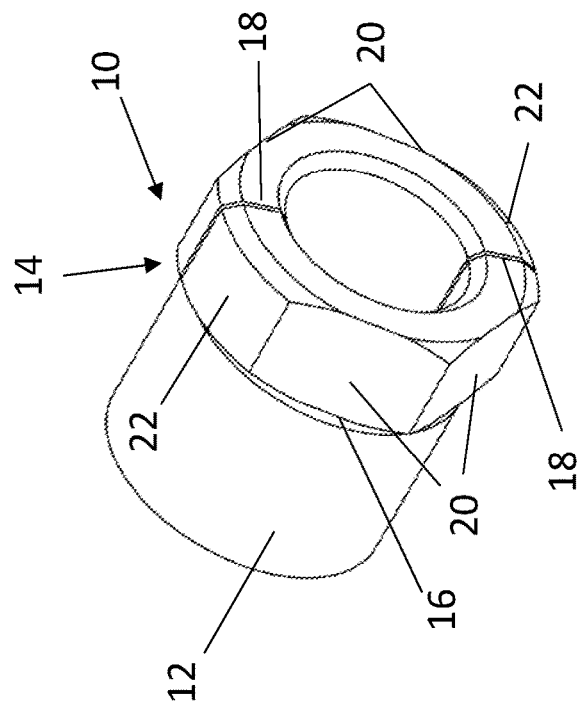
FIG. 6 is a perspective view of an alternative embodiment of a breakaway nut according to the present disclosure.
Figure 7:
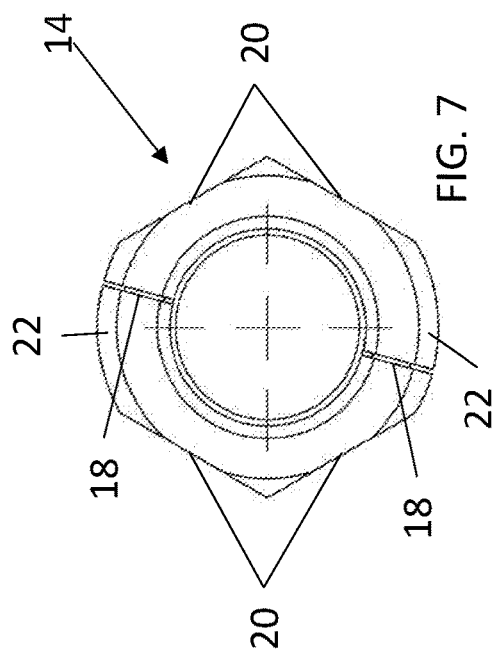
FIG. 7 is a top view of the embodiment of FIG. 6.
Figure 5:
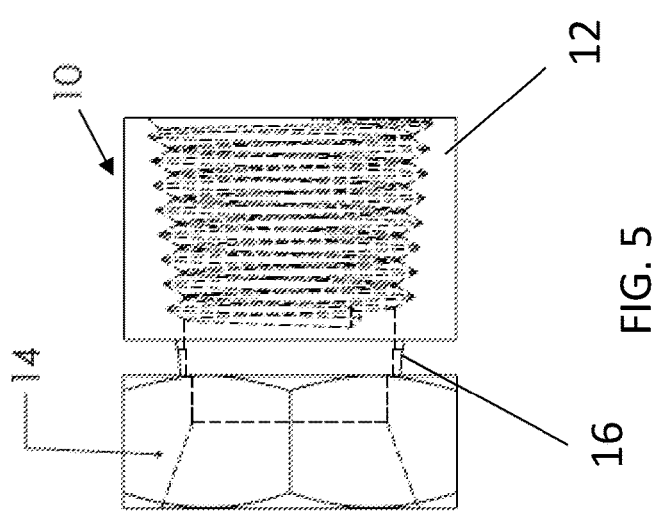
FIG. 5 is a side view of the apparatus of FIG. 2, showing some internal detail in broken lines.

FIGS. 6 and 7 show an alternative embodiment according to the present disclosure, wherein hex portion 14 has a plurality of radially outwardly flat portions 20 which are suitable with engagement for a tool, and at least one, preferably two opposed rounded portions 22 which are aligned with slot 18 such that slot 18 extends through rounded portions 22. Rounded portions 22 prevent a tool from being used to engage the hex portion on a surface where the slot 18 is present. This helps to present undesirable crushing of the head portion of the apparatus, and other distortion of the hex portion around slot 18 which would be undesirable. Instead, tools can only engage surfaces 20 which are solid and suitable for engaging with such tool.

Nut 10 according to the invention can be made from any suitable material, and for example could be made from a material selected from the group consisting of brass, bronze, steel, and stainless steel. Other suitable materials may be readily apparent to a person skilled in the art.

It should be appreciated that although the present description is given in terms of specific embodiments of the invention, alterations and modifications would be apparent to those of skill in the art, and such alterations and modifications are considered to be within the broad scope of the invention as defined herein.

The invention claimed is:

1. A breakaway nut, comprising:
   a threaded section;
   a head portion having a side wall defining a central passage and a plurality of radially outwardly facing flat surfaces on the side wall; and
   a breakaway portion connecting the threaded section and the head portion, wherein a slot is defined in the head portion along an axial dimension of the head portion and extending through two locations of the sidewall whereby, upon breaking of the breakaway portion, the head portion separates into two pieces.

2. The apparatus of claim 1, wherein the breakaway portion comprises a structurally weakened portion such that, when torque is applied to the head portion, the breakaway portion fails before the head portion or the threaded section when a threshold torque is exceeded.

3. The apparatus of claim 1, wherein the slot extends through an entire axial dimension of the head portion.

4. The apparatus of claim 3, wherein the slot extends into the breakaway portion.

5. The apparatus of claim 1, wherein the slot divides the head portion into radial sections.

6. The apparatus of claim 1, wherein the slot has a width which is between 1 and 15% of the diameter of the head portion.

7. The apparatus of claim 1, wherein the breakaway nut is made from a material selected from the group consisting of brass, bronze, steel, and stainless steel.

8. The apparatus of claim 1, wherein the threaded section, the head portion and the breakaway portion collectively define a central passage through the breakaway nut.

9. The apparatus of claim 1, wherein the head portion defines the plurality of flat surfaces for engaging with a tool and rounded surfaces between the flat surfaces, and wherein the slot extends through the rounded surfaces of the head portion such that a tool cannot be used to engage surfaces through which the slot passes.

10. The apparatus of claim 9, wherein the slot extends through the rounded surfaces offset from a center portion of the rounded surfaces.

* * * * *